(12) United States Patent
Kegeler et al.

(10) Patent No.: US 9,329,022 B2
(45) Date of Patent: May 3, 2016

(54) ROLLER BEARING ARRANGEMENT WITH AN ANGLE SENSOR

(75) Inventors: Joerg Kegeler, Schleusingen (DE); Juergen Weyh, Viernau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 660 days.

(21) Appl. No.: 13/643,465

(22) PCT Filed: Apr. 26, 2011

(86) PCT No.: PCT/EP2011/056567
§ 371 (c)(1),
(2), (4) Date: Jan. 22, 2013

(87) PCT Pub. No.: WO2011/134955
PCT Pub. Date: Nov. 3, 2011

(65) Prior Publication Data
US 2013/0113470 A1    May 9, 2013

(30) Foreign Application Priority Data
Apr. 26, 2010 (DE) .......................... 10 2010 018 207

(51) Int. Cl.
*G01B 7/30* (2006.01)
*F16C 41/00* (2006.01)
*G01M 1/00* (2006.01)
*G06F 1/00* (2006.01)
*F16C 19/06* (2006.01)

(52) U.S. Cl.
CPC . *G01B 7/30* (2013.01); *F16C 41/00* (2013.01); *F16C 19/06* (2013.01); *G01M 1/00* (2013.01); *G06F 1/00* (2013.01); *G06F 2200/00* (2013.01)

(58) Field of Classification Search
CPC ........ G01M 1/00; G06F 1/00; G06F 2101/00; G06F 2200/00
See application file for complete search history.

(56) References Cited

U.S. PATENT DOCUMENTS

| 3,587,325 A | * | 6/1971 | Lee | G01M 17/013 33/203.13 |
| 3,678,493 A | * | 7/1972 | Shuey | G01M 15/00 340/529 |
| 5,309,094 A | | 5/1994 | Rigaux et al. | |
| 7,135,860 B2 | | 11/2006 | Miya et al. | |
| 7,429,133 B2 | | 9/2008 | Gallion et al. | |
| 2004/0062459 A1 | * | 4/2004 | Bochet | 384/448 |

(Continued)

FOREIGN PATENT DOCUMENTS

| EP | 0 522 933 | 1/1993 |
| EP | 1 518 126 | 1/2008 |

*Primary Examiner* — Huy Q Phan
*Assistant Examiner* — Temilade Rhodes-Vivour
(74) *Attorney, Agent, or Firm* — Davidson, Davidson & Kappel, LLC

(57) ABSTRACT

A roller bearing configuration having an angle sensor includes a roller bearing. The Angle sensor an absolute encoder with a sensor ring connected in a rotationally fixed manner to one of the bearing rings of the roller bearing, and a measuring element connected in a rotationally fixed manner to the second bearing ring, wherein coils, namely at least one transmitting coil and at least one receiving coil, are situated on the sensor ring, and the transmitting coil has an axis of symmetry, which is identical to the axis of rotation and is situated in an annular metallic pot core, which has a U-shaped cross section and is concentric with the axis of rotation of the roller bearing, and a receiving coil is situated partially inside and partially outside of the pot core.

22 Claims, 5 Drawing Sheets

(56) References Cited

U.S. PATENT DOCUMENTS

| | | | |
|---|---|---|---|
| 2006/0075810 A1* | 4/2006 | Gu | G01M 1/00 73/146 |
| 2006/0087315 A1 | 4/2006 | Inoue | |
| 2006/0104558 A1 | 5/2006 | Gallion | |
| 2008/0304779 A1* | 12/2008 | Heim et al. | 384/448 |
| 2010/0269770 A1* | 10/2010 | Kokubo et al. | 123/90.15 |
| 2011/0207578 A1* | 8/2011 | Lee et al. | 477/34 |

* cited by examiner

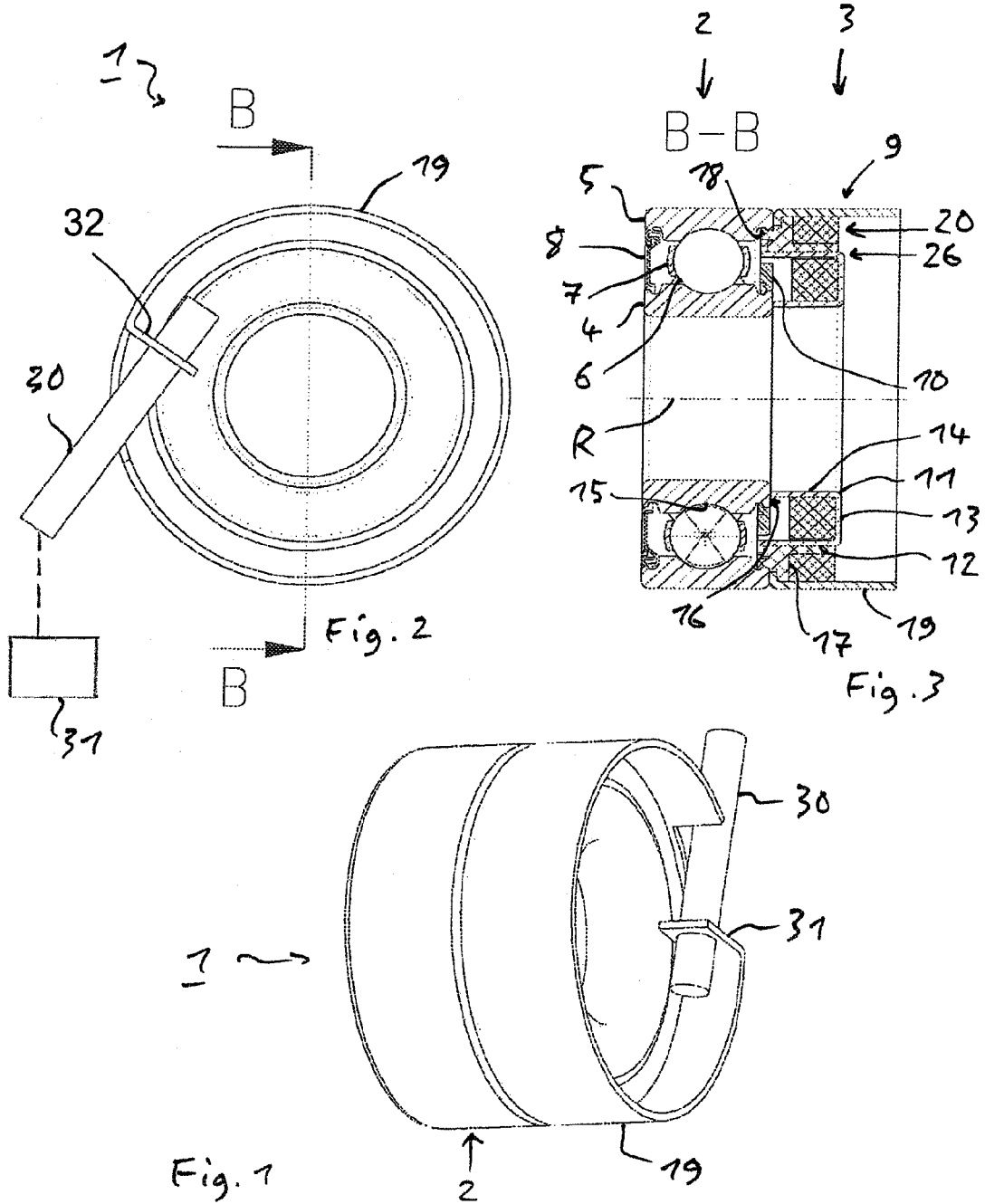

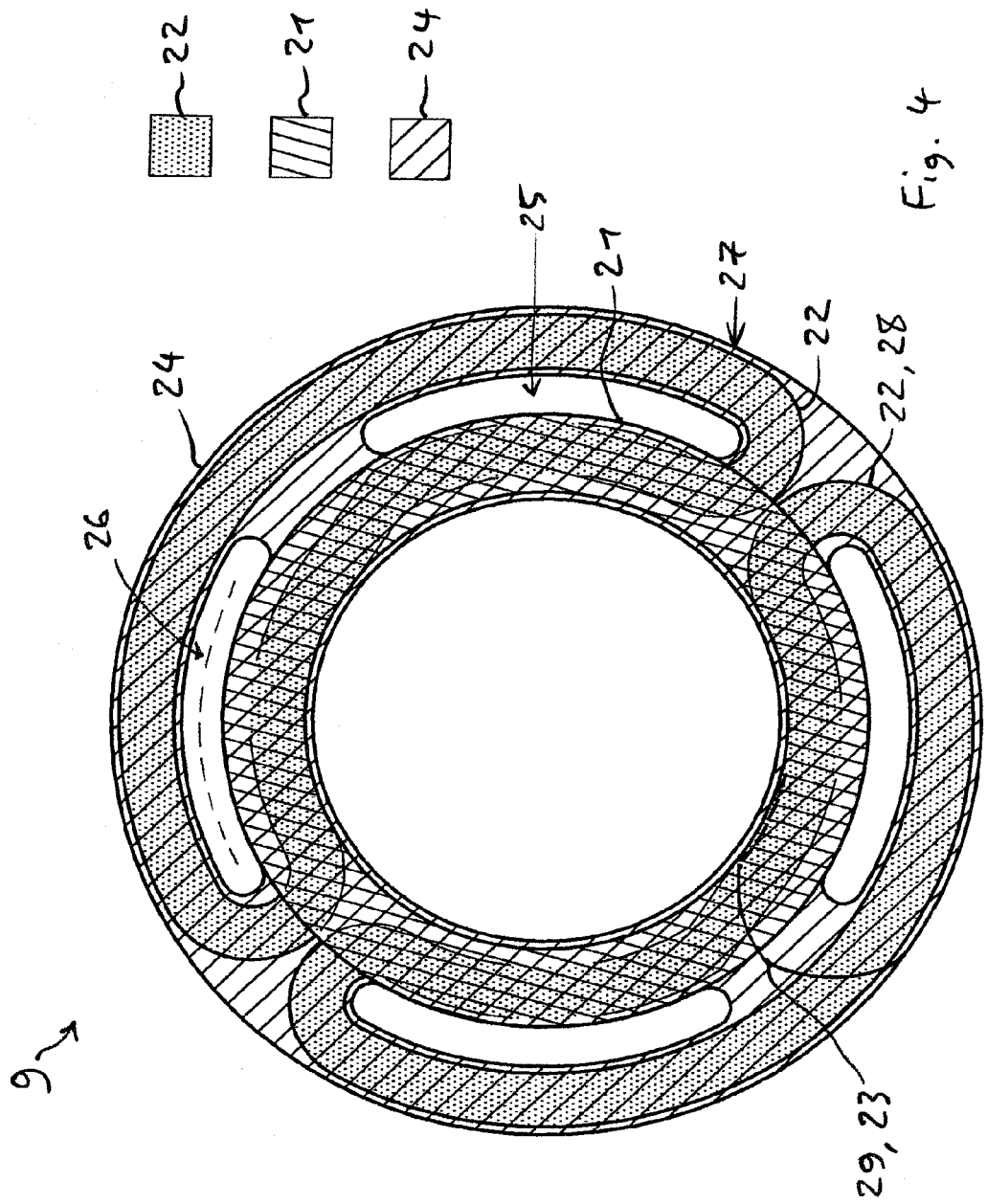

ROLLER BEARING ARRANGEMENT WITH AN ANGLE SENSOR

FIELD OF THE INVENTION

The present invention relates to a roller bearing configuration having an angle sensor and a method for assembling such a roller bearing configuration having an angle sensor.

BACKGROUND

A generic configuration including a roller bearing and an angle sensor, which is designed as an absolute encoder and is also referred to as a resolver, is known from US 2006/0087315 A1, for example. This angle sensor has a stator connected to the outer ring of the roller bearing and a rotor, which cooperates with the stator and is designed as an eccentric ring formed by the inner ring of the roller bearing.

Another roller bearing equipped with a sensor provided for detecting a rotation parameter is known from EP 1 518 126 B1. In this case, microtransmitting and microreceiving coils of the sensor are situated on a carrier, namely a substrate of a printed circuit. Furthermore, a processing circuit containing an oscillator and a phase demodulator is situated on the carrier.

U.S. Pat. No. 7,135,860 B2 describes a resolver, which operates according to the variable reluctance principle and has a rotor having multiple detection areas, which should facilitate reliable zero point detection in particular.

SUMMARY OF THE INVENTION

It is an object of the present invention to provide a configuration of a bearing and an angle sensor suitable in particular for smaller roller bearing types, for example, grooved ball bearings having an outside diameter of less than 40 mm, this configuration being characterized by small space requirements and by the option of particularly simple assembly. Another additional or alternate object of the present invention is to provide an angle sensor, which is advantageous in terms of manufacturing technology and is usable even without being assembled with a roller bearing.

The present invention provides an angle sensor, which operates according to the variable reluctance principle, and a configuration including a roller bearing and also being achieved by a sensor system and by a method for assembly of a roller bearing configuration, including an angle sensor designed for an absolute value measurement. Embodiments and advantages of the present invention mentioned below in conjunction with these devices shall also apply analogously for the assembly method and vice-versa.

The roller bearing configuration having the angle sensor includes a roller bearing having two bearing rings, each in one or more parts, concentric with the axis of rotation of the roller bearing, namely an inner ring and an outer ring, at least one row of rolling elements, for example, balls, needles, cylindrical rollers, tapered rollers, ball rollers or barrel rollers, being situated between the bearing rings, an angle sensor, which is coupled to the roller bearing, is provided for detection of the angular position of the first bearing ring in relation to the second bearing ring, i.e., is suitable for an absolute angle measurement, this angle sensor having a sensor ring connected in a rotationally fixed manner to a bearing ring or a surrounding component, in particular a housing, and a measuring element connected in a rotationally fixed manner to the second bearing ring, in which coils, namely at least one—preferably exactly one—transmitting coil and at least one receiving coil are situated on the sensor ring, a signal being transmissible via a magnetic circuit between the transmitting coil and the receiving coil, and a variable reluctance exists in the magnetic circuit due to the measuring element, the transmitting coil has an axis of symmetry, namely the central axis, which is identical to the axis of rotation of the roller bearing, and is situated in an annular pot core, which has a U-shaped cross section, is concentric with the axis of rotation, is connected to one of the bearing rings and forms a part of the magnetic circuit, the measuring element is designed as a ring situated between or in front of the legs of the U-shaped pot core, i.e., opposite the base of the U-shaped pot core, at least one receiving coil which is situated at least partially inside and partially outside of the pot core.

The measuring element, which is used to close the magnetic circuit, is preferably situated on the rotating ring, i.e., in the case of a bearing configuration having a rotating shaft, on the inner ring. In the case of a stationary inner ring and a rotating outer ring, the measuring element is connected to the outer ring accordingly.

At least one coil, preferably each coil of the sensor ring, is designed in a particularly production-friendly manner as a printed circuit. In a preferred embodiment, various receiving coils, namely sine and cosine coils, each formed by multiple windings, are provided here, the windings of sine coils and cosine coils being situated in alternation on successive layers of a printed circuit designed as a multilayer circuit board. Two windings of a sine coil and two windings of a cosine coil are preferably situated on each layer. In this way, good error compensation is achievable and geometric inaccuracies and the associated inhomogeneities in the magnetic field in particular may be compensated. The signals supplied by the various sine coils and cosine coils are subtracted from one another by a series connection and are processed further outside of the sensor. According to an alternative and specific embodiment, which is space-saving in particular, sine coils and cosine coils are situated on the same layer.

The feed of a signal, for example, a 4 kHz signal into the coils constructed as multilayer circuit boards, occurs preferably from the inside to the outside, thereby minimizing capacitive couplings between the primary coil and the secondary coil and allowing the elimination of a shield layer on the circuit board.

According to a preferred specific embodiment, the roller bearing is designed as a radial bearing, for example, a grooved ball bearing, the sensor ring being connected to the outer ring as the first bearing ring, and the measuring element in the form of a ring eccentric with the bearing axis, preferably a double-eccentric ring, is connected to the inner ring as the second bearing ring. In deviation from an eccentric or double-eccentric design of the ring, which functions as the measuring element, other specific embodiments are also possible in which the ring is situated centrically with respect to the axis of rotation and has solely circular contours—as seen in the axial direction—but has a varying thickness along the circumference. In both specific embodiments, there is an angle-dependent air gap between the measuring element and the pot core.

To connect the metallic pot core to a retaining structure of the angle sensor, which is rigid in relation to the outer ring, and to the coils, the pot core is broken in several locations on its radially outer U leg. The retaining structure preferably includes a retaining element designed as an injection-molded plastic part, which is attached directly to the outer ring and is surrounded radially by a supporting ring made of metal, which contacts one end face of the outer ring. Parts made of metal, on the one hand, and of plastic, on the other hand, such as the pot core and the retaining element, may be manufactured economically by the two-component injection molding process.

In an advantageous embodiment, the supporting ring protrudes beyond the pot core in the axial direction, according to a first variant, the supporting ring having a fastening strap in its area protruding beyond the pot core, and is bent radially inward from its circumference for holding a cable connected to the sensor ring. According to an alternative variant, the supporting ring has only one recess on its circumference, which is provided for a cable pass-through. The cable is preferably designed as a flexible circuit board in this area and is attached to a strip holder, which is designed in one piece with the pot core and merges into the U base of the pot core, which is orthogonal to the axis of rotation of the angle sensor and the entire roller bearing configuration.

An iron powder core is optionally provided in the pot core. This iron powder core combines good magnetic properties with low electrical conductivity and low eddy currents in an advantageous manner. Similarly, the measuring element may also be formed by a component containing iron powder.

A particularly good utilization of space is achieved in a preferred specific embodiment in which the radially outer U leg of the pot core is situated radially outside of the inner ring, and the radially inner U leg of the pot core is situated radially inside of the track of the rolling element formed by the inner ring. The radius of the circle which is described by the outer U leg and is symmetrical with the axis of rotation is preferably smaller than the inside radius of the outer ring.

To summarize briefly, the roller bearing configuration according to the present invention may have the following features:

a roller bearing which is connected to an angle sensor which is designed as an absolute value encoder and operates according to the variable reluctance principle, and which has a sensor ring connected to one of the bearing rings of the roller bearing in a rotationally fixed manner and a measuring element designed as a ring connected in a rotationally fixed manner to the second bearing ring, in which coils, namely at least one transmitting coil and at least one receiving coil, are situated on the sensor ring, and the transmitting coil has an axis of symmetry which is identical to the axis of rotation and the transmitting coil is situated in an annular metallic pot core, which is concentric with the axis of rotation of the roller bearing and has a U-shaped cross section and a receiving coil is situated partially inside and partially outside of the pot core.

The advantage of the present invention lies in particular in the fact that with the U-shaped pot core, in which a single transmitting coil—without an iron ore—is situated, a very space-saving resolver is provided which is usable for the commutation of electric motors, among other things, and is suitable for small types of roller bearings, for example, grooved ball bearings having an inside diameter of 15 mm and an outside diameter of 35 mm, temperatures above 150° C. and high impact and vibration loads.

A roller bearing configuration equipped with the angle sensor is assembled according to the present invention in the following steps:

a roller bearing designed as a radial bearing, for example, a grooved ball bearing or an angular ball bearing or roller bearing is provided having two bearing rings, namely an inner ring and an outer ring, at least one peripheral groove adjacent to a rolling element track and suitable in principle for receiving a sealing ring being formed in each bearing ring, a metallic ring, which is eccentric with the axis of rotation of the roller bearing and functions as a measuring element is snapped into the peripheral groove in the inner ring, a retaining element designed as an injection-molded plastic part is inserted into a supporting ring made of metal whose outside diameter corresponds at most to the outside diameter of the outer ring of the roller bearing, an annular gap remaining between the inside diameter of the supporting ring and a section of the retaining element, the retaining element is snapped into the peripheral groove of the outer ring, the supporting ring coming to a stop against an end face of the outer ring, a sensor ring designed as a printed circuit and provided for carrying out an angle measurement according to the variable reluctance principle has coils, namely at least one transmitting coil and at least one receiving coil situated on it and is attached to the retaining element in such a way that it is situated partially in the annular gap between the retaining element and the supporting ring and partially radially inside of the retaining element, slots which describe the section of an annular space remaining between the inside circumference of the retaining element and the parts of the sensor ring situated radially inside of the retaining element, an annular pot core made of metal, having a U-shaped cross section and is open toward the end face of the roller bearing, forming a component of a magnetic circuit, like the eccentric ring, is pushed onto the configuration of the retaining element, the supporting ring and the sensor ring in the axial direction and snapped together with same, a U leg of the pot core, which is situated on the outside is in contact with the inside circumference of the retaining element and engages in the annual space adjacent thereto while an inner U leg of the pot core is situated completely radially inside of the sensor ring.

The inner U leg of the pot core has an inside diameter, which is somewhat larger than the inside diameter of the inner ring. Optionally an inner supporting sleeve, which is pushed onto the shaft surrounded by the inner ring of the roller bearing, in the area of the U leg of the pot core situated radially inside, comes to a stop against the end face of the inner ring.

A sensor system which achieves the object on which the present invention is based has a sensor ring surrounding an axis of rotation and has a measuring element which rotates in relation to the sensor ring, in which coils, namely at least one transmitting coil and at least one receiving coil, are situated on the sensor ring, a signal being transmissible between the transmitting coil and the receiving coil via a magnetic circuit and a variable reluctance exists in the magnetic circuit due to the measuring element, the transmitting coil is situated in an annular pot core which forms a part of the magnetic circuit, has a U-shaped cross section and is concentric with the axis of rotation, the measuring element is designed as a ring which closes the magnetic circuit between the legs of the U-shaped pot core, a receiving coil is situated partially inside and partially outside of the pot core.

Exemplary embodiments of the present invention are explained in greater detail below with reference to the drawings.

BRIEF DESCRIPTION OF THE DRAWINGS

FIG. 1 shows a first exemplary embodiment of a roller bearing configuration having an angle sensor in a perspective view, FIG. 2 shows the configuration according to FIG. 1 in a top view, FIG. 3 shows the configuration according to FIG. 1 in a sectional diagram, FIG. 4 shows coils of a sensor ring of the angle sensor of the configuration according to FIG. 1.

DETAILED DESCRIPTION

Figure 5:
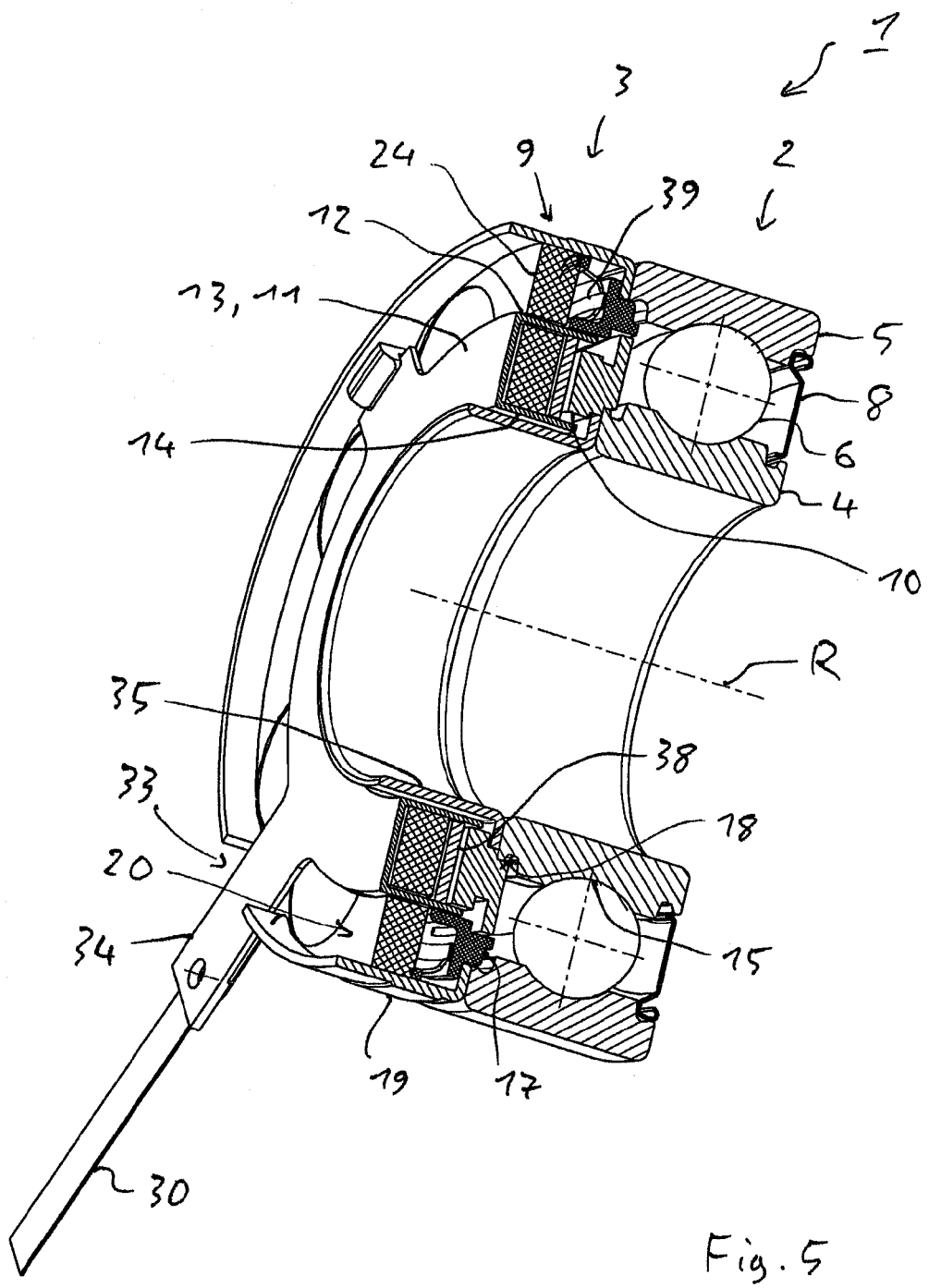
FIG. 5 shows a second exemplary embodiment of a roller bearing configuration having an angle sensor in a perspective sectional view.

The following description in particular regarding the design of the angle sensor always relates to all the exemplary embodiments unless indicated otherwise. The same reference numerals are used for similar parts or parts having the same effect.

A roller bearing configuration labeled with reference numeral 1 on the whole and shown in FIGS. 1 through 3 is composed of a roller bearing 2, namely a grooved ball bearing and an angle sensor 3. FIG. 3 illustrates an inner ring 4, an outer ring 5, rolling elements 6, namely balls, a cage 7 carrying same and a sealing disk 8 on a first end face of roller bearing 2 as components of roller bearing 2.

Angle sensor 3 coupled to roller bearing 2 has a sensor ring 9, which is connected to outer ring 5 in a rotationally fixed manner and has a measuring element 10, which is designed as an eccentric metal ring in relation to axis of rotation R of roller bearing 2 and is connected to inner ring 4 in a rotationally fixed manner.

With regard to the structure of sensor ring 9, reference is made to FIGS. 3 and 4. Sensor ring 9 has an annular pot core 11, which has a U-shaped cross section and is concentric with axis of rotation R of roller bearing 2. The U profile of pot core 11 is open toward the end face of roller bearing 2 facing away from sealing disk 8, an outer U leg 12 resting on the surface of an imaginary cylinder whose axis of symmetry is identical to axis of rotation R and whose radius is larger than the outside radius of inner ring 4 but is smaller than the inside radius of outer ring 5. A U base 13 which runs in the radial direction—in relation to axis of rotation R—is connected to an outer U leg 12 and also to an inner U leg 14, which rests on the surface of an imaginary cylinder concentric with axis of rotation R, its radius being larger than the inside radius of inner ring 4 but smaller than the outside radius of inner ring 4. The minimal radius of track 15 of rolling element 6 on inner ring 4, i.e., the minimal distance of track 15 from axis of rotation R is greater than the radius of the cylinder described by inner U leg 14. A sealing gap 16 is formed between the end of inner U leg 14 facing the end face of roller bearing 2 and inner ring 4.

A retaining element 17 made of plastic, which is secured in a peripheral groove 18 in outer ring 5, is provided for holding pot core 11 and the additional components of sensor ring 9, which are described in greater detail below, on outer ring 5. A supporting ring 19 made of sheet metal which comes to a stop against the end face of outer ring 5 and functions as an assembly aid as well as providing mechanical protection for angle sensor 3 is situated radially outside of retaining element 17 with an outside diameter which is only slightly smaller than the outside diameter of outer ring 5. An annular space 20, i.e., an annular gap, is formed between the inner lateral area of supporting ring 19 and retaining element 17, this gap being filled in the completely assembled roller bearing configuration 1 (FIGS. 1-3) with components of sensor ring 9, which are described in greater detail below.

Sensor ring 9 has a transmitting coil 21, which lies concentrically with axis of rotation R essentially in a plane parallel to the end face of roller bearing 2, i.e., is situated completely inside of the U profile of pot core 11. The average diameter of transmitting coil 21 is approximately the same as the diameter of track 15 on inner ring 4. In the exemplary embodiment, transmitting coil 21 is designed as a 12-layer multilayer circuit board. Various receiving coils 22, 23 having a coupling in the manner of a transformer cooperate with transmitting coil 21, which is acted upon by a signal at a frequency of 4000 Hz, for example. Each receiving coil 22, 23 is situated partially inside of the U profile of pot core 11 and partially outside of the U profile. Corresponding circuit board 24 on which receiving coils 22, 23, which are designed as printed circuits, are situated like transmitting coil 21, has multiple segmented openings 25 describing individual sections of an annular space. On the one hand, sections of retaining element 17 protrude into these openings 25; on the other hand, slots 26 through which sections of outer U leg 12 of pot core 11 are inserted in the completely assembled state remain radially directly inside of retaining element 17 when circuit board 24 is attached to retaining element 17. These sections of outer U leg 12 protrude further toward rolling element 6 in the axial direction—in relation to axis of rotation R—even farther beyond the end face of roller bearing 2, which faces angle sensor 3, than inner U leg 14.

Measuring element 10 is situated radially inside of the end of outer U leg 12 facing roller bearing 2, thus forming a variable angle-dependent gap between aforementioned components 12, 10 of the magnetic circuit used for the angle measurement. To measure the magnetic resistance, which depends on the gap width, various sine coils 22 and cosine coils 23, which are merely indicated in FIG. 4, are provided as receiving coils 22, 23. There are either two windings 28 of sine coils 22 or two windings 29 of cosine coils 23 on a single layer 27, i.e., on a single layer of circuit board 24, windings 28 of sine coil 22 being rotated by 90° with respect to windings 29 of cosine coils 23. Windings 28 of sine coils 22 and windings 29 of cosine coils 23 are arranged alternately on different layers 27, i.e., an additional layer 27 having windings 29 of cosine coils 23 is laid on a layer 27 having windings 28 of sine coils 22, and then a layer 27 belonging to sine coils 22 is laid on the latter and so forth. On the whole, circuit board 24 is made up of eleven layers 27 each of sine coils 22 and cosine coils 23.

The electric signal supplied by angle sensor 3 is transmitted via a cable 30 connected to coils 21, 22, 23 to a triggering and evaluation unit 31, which is spatially separated from angle sensor 3. Due to the spatial separation between angle sensor 3 and any electronic components, roller bearing configuration 1 including angle sensor 3 is suitable in particular for high operating temperatures of up to 155° C., for example. Cable 30 is held on a fastening strap 32, which is bent inward from an area of supporting ring 19 protruding beyond pot core 11 in the axial direction.

The specific embodiment according to FIG. 5 corresponds to the exemplary embodiment according to FIGS. 1 through 4 with regard to the fundamental function of roller bearing configuration 1, including angle sensor 3. There are differences between the two specific embodiments, in particular with regard to the mechanical connection of angle sensor 3 to roller bearing 2, the connection of cable 30 and the form of measuring element 10.

Retaining element 17, made of plastic, attached to outer ring 5 of roller bearing 2 used to retain sensor ring 9 has a smaller extent in the axial direction, in relation to axis of rotation R, and borders on an end face of circuit board 24 in the exemplary embodiment according to FIG. 5 in comparison with the exemplary embodiment according to FIGS. 1 through 4. Likewise, supporting ring 19 in the exemplary embodiment according to FIG. 5 has a smaller axial extent, so that roller bearing configuration 1 has a more space-saving design on the whole. This is made possible by an extremely narrow design of electrical and mechanical connecting components.

U base 13 of pot core 11 is connected in one piece to a strip-shaped cable bracket 34, which protrudes through a recess 33 in supporting ring 19 and is directed radially outward. Cable 30, designed in this case as a flexible circuit board, is attached to this cable bracket 34 made of sheet metal. The circuit board, which merges into flat cable 30 in one piece, is reinforced by an additional stronger layer within U-shaped pot core 11. Metallic cable bracket 34 fulfills three functions, namely tension relief, angle adjustment of sensor ring 9 and equalization of potential with surrounding components. With regard to the angular position of sensor ring 9, the angular relationship between pot core 11 and a surrounding component, in particular a motor housing of an electric motor, is crucial for the function of angle sensor 3.

In addition to outer supporting ring 19 on outer ring 5, an inner supporting ring 35 held on inner ring 4 is provided in the exemplary embodiment according to FIG. 5, two supporting rings 19, 35, each having the same axial extent and protruding slightly beyond U base 13 of pot core 11. Inner supporting ring 35, like outer supporting ring 19, allows the transfer of axial forces through roller bearing configuration 1 and provides mechanical protection for angle sensor 3, while also ensuring an improved sealing of roller bearing configuration 1.

Figure 6:
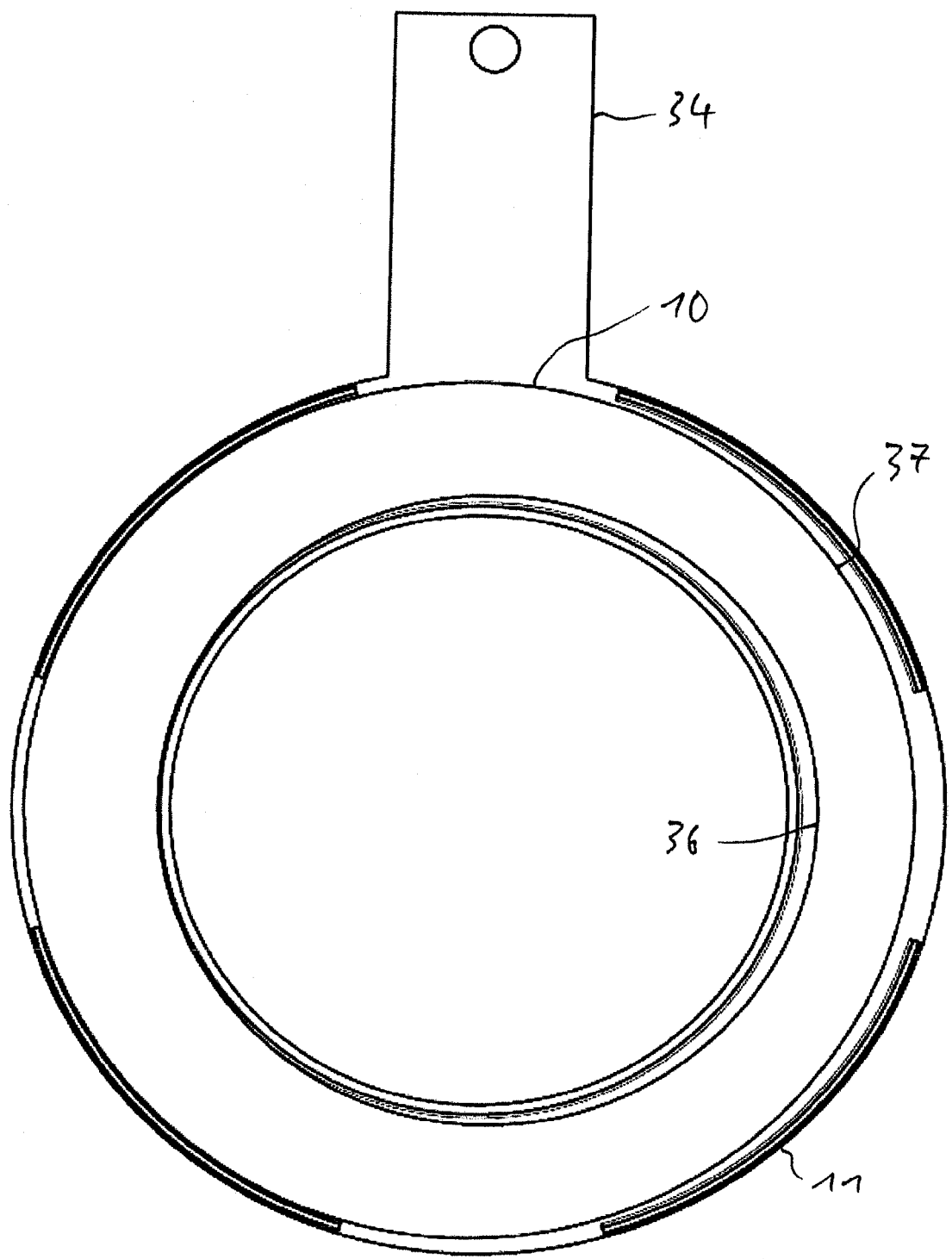
FIG. 6 shows details of the configuration according to FIG. 5 in a top view.

The geometry of the ring, which functions as measuring element 10, also contributes toward optimized sealing, which is discernible in cross section in FIG. 5. FIG. 6 shows this ring, i.e., measuring element 10 of angle sensor 3, in a top view. The double-eccentric shape of measuring element 10 is readily apparent. Both inner contour 36 and outer contour 37 of measuring element 10 have an eccentric design.

Assembly of roller bearing configuration 1 according to FIG. 5 begins on insertion of pot core 11 into annular circuit board 24, for example. A nonmagnetic spacer disk 38 is subsequently inserted into pot core 11, which has the function of ensuring that the distance between U legs 12, 14 always remains exactly the same. For the same purpose, a spring element 39, pressing outer U leg 12 against spacer disk 38 parallel to U base 13, is provided radially outside of pot core 11 between retaining element 17 and outer supporting ring 19 in the completely assembled roller bearing configuration 1 shown in FIG. 5.

Figure 8:
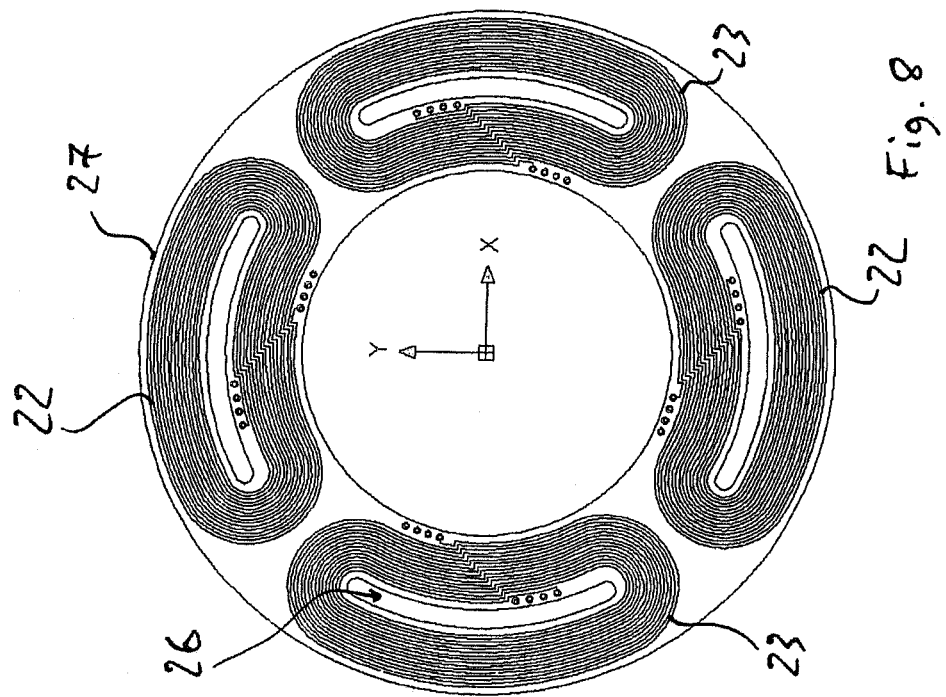
FIGS. 7 and 8 show various variants of coils of a sensor ring of the angle sensor of the configuration according to FIG. 5.
Figure 7:
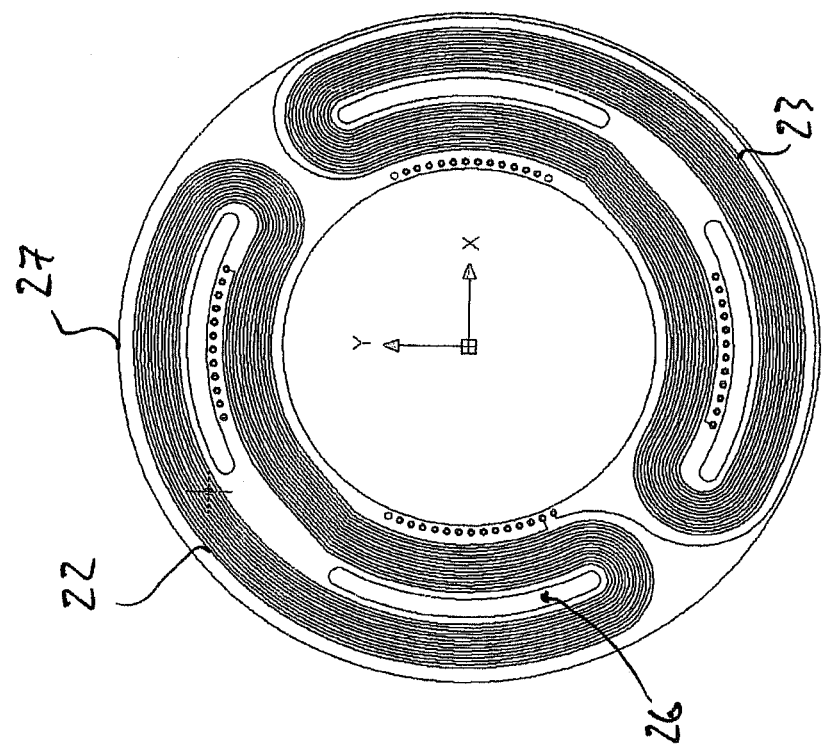

FIGS. 7 and 8 show different variants of a layer 27 of sensor ring 9, each of which is suitable for the specific embodiment according to FIGS. 1 through 4 as well as for the specific embodiment according to FIGS. 5 and 6. Either two sine coils 22 or two cosine coils 23 are situated on layer 27 in the example according to FIG. 7 as well as in the example according to FIG. 4, layer 27 according to FIG. 8 having four coils, namely two sine coils 22 and two cosine coils 23, each of these receiving coils 22, 23 extending over approximately 90°. All layers 27 of circuit board 24 according to FIG. 8 are congruent, i.e., are situated without any relative rotation. The number of layers 27 is half as great as in the variant according to FIG. 7 with an identical number of windings 28, 29 due to the configuration of those sine coils and negative sine coils 22 as well as cosine coils and negative cosine coils 23 on a single layer 27. In contrast with the variant according to FIG. 7, each winding 28, 29 according to FIG. 8 includes only one of four slot-shaped openings 25 in circuit board 24 instead of two. Angle resolutions on the order of 1° are achievable with all the specific embodiments.

LIST OF REFERENCE NUMERALS 1 roller bearing configuration
2 roller bearing
3 angle sensor
4 inner ring
5 outer ring
6 rolling element
7 cage
8 sealing disk
9 sensor ring
10 measuring element
11 pot core
12 outer U leg
13 U base
14 inner U leg
15 track
16 sealing gap
17 retaining element
18 peripheral groove
19 supporting ring
20 annular space
21 transmitting coil
22 receiving coil
23 receiving coil
24 circuit board
25 opening
26 slot
27 layer
28 winding
29 winding
30 cable
31 triggering and evaluation unit
32 fastening strap
33 recess
34 cable bracket
35 supporting ring
36 inner contour
37 outer contour
38 spacer disk
39 spring element
R axis of rotation

What is claimed is:

1. A roller bearing configuration comprising:
a roller bearing having a first bearing ring and a second bearing ring concentric with an axis of rotation, the first and second bearing rings including an inner bearing ring and outer bearing ring, the roller bearing including rolling elements situated between the inner and outer bearing rings; and
an angle sensor coupled to the roller bearing for detection of an angular position of the first bearing ring in relation to the second bearing ring, the angle sensor including a sensor ring connected to the first and second bearing rings and a measuring element connected to the second bearing ring in a rotationally fixed manner, at least one transmitting coil and at least one receiving coil situated on the sensor ring, a signal being transmissible between the transmitting coil and the receiving coil via a magnetic circuit and a variable reluctance existing in the magnetic circuit due to the measuring element, the transmitting coil surrounding the axis of rotation and situated in a pot core having a U-shaped cross section, being concentric with the axis of rotation, being connected to one of the first and second bearing rings and forming a part of the magnetic circuit, the measuring element being a ring forming a magnetically conductive connection between legs of the U-shaped pot core, the receiving coil being situated partially inside and partially outside of the pot core.

2. The roller bearing configuration as recited in claim 1 wherein at least one of the transmitting and receiving coils is a printed circuit.

3. The roller bearing configuration as recited in claim 2 wherein the at least one receiving coil includes sine coils and cosine coils, each formed by multiple windings, the windings of the sine coils and the windings of the cosine coils being situated in alternation on layers stacked one above the other in the printed circuit, the printed circuit being designed as a multilayer circuit board.

4. The roller bearing configuration as recited in claim 3 wherein two winding configurations of one of the sine coils constructed from multiple intermingled windings and two winding configurations of one of the cosine coils, each constructed of multiple intermingled windings, are situated on each layer.

5. The roller bearing configuration as recited in claim 2 wherein the at least one receiving coil includes sine coils and cosine coils, each formed by multiple windings, the windings of the sine coils and the windings of the cosine coils being situated on a shared layer of the printed circuit, the printed circuit being designed as a multilayer circuit board.

6. The roller bearing configuration as recited in claim 5 wherein two windings of one of the sine coils and two windings of one of the cosine coils are situated on the shared layer.

7. The roller bearing configuration as recited in claim 1 further comprising a triggering and evaluation unit situated outside of the angle sensor and connected to the transmitting and receiving coils.

8. The roller bearing configuration as recited in claim 1 wherein the roller bearing is a radial bearing, the sensor ring being connected to the outer ring as the first bearing ring, and the measuring element being in the form of a ring eccentric with the axis of rotation and connected to the inner ring as the second bearing ring.

9. The roller bearing configuration as recited in claim 1 wherein the roller bearing is a radial bearing, the sensor ring being connected to the outer ring as the first bearing ring, and the measuring element being in the form of a ring concentric with the axis of rotation and having nonparallel cover surfaces connected to the inner ring as the second bearing ring.

10. The roller bearing configuration as recited in claim 8 wherein the sensor ring has an eccentric contour on a radially inner side as well as on a radially outer side.

11. The roller bearing configuration as recited in claim 1 wherein the roller bearing is a radial bearing, the sensor ring being connected to the outer ring as the first bearing ring, and the measuring element being in the form of a ring eccentric with the axis of rotation and connected to the inner ring as the second bearing ring or in the form of a ring concentric with the axis of rotation and having nonparallel cover surfaces connected to the inner ring as the second bearing ring, the pot core having multiple break-throughs on a radially outer U leg.

12. The roller bearing configuration as recited in claim 1 wherein the roller bearing is a radial bearing, the sensor ring being connected to the outer ring as the first bearing ring, and the measuring element being in the form of a ring eccentric with the axis of rotation and connected to the inner ring as the second bearing ring or in the form of a ring concentric with the axis of rotation and having nonparallel cover surfaces connected to the inner ring as the second bearing ring, the pot core being surrounded radially by a retaining element attached to the outer ring.

13. The roller bearing configuration as recited in claim 12 wherein the retaining element is an injection-molded plastic part.

14. The roller bearing configuration as recited in claim 12 wherein the retaining element is surrounded radially by a supporting ring made of metal, the supporting ring contacting an end face of the outer ring.

15. The roller bearing configuration as recited in claim 14 wherein the supporting ring protrudes beyond the pot core in the axial direction, the supporting ring having a fastening strap bent radially inward from a circumference in an area protruding beyond the pot core for retaining a cable connected to the sensor ring.

16. The roller bearing configuration as recited in claim 14 wherein the supporting ring protrudes beyond the pot core in the axial direction, the supporting ring having a recess on a circumference, a strip-shaped cable bracket designed in one piece with the pot core protruding radially outward through the recess.

17. The roller bearing configuration as recited in claim 1 wherein the roller bearing is a radial bearing, the sensor ring being connected to the outer ring as the first bearing ring, and the measuring element being in the form of a ring eccentric with the axis of rotation and connected to the inner ring as the second bearing ring or in the form of a ring concentric with the axis of rotation and having nonparallel cover surfaces connected to the inner ring as the second bearing ring, a radially outer U leg of the pot core being situated radially outside of the inner ring, and a radially inner U leg of the pot core being situated radially inside of a track of the rolling element formed by the inner ring.

18. The roller bearing configuration as recited in claim 1 wherein the roller bearing is a radial bearing, the sensor ring being connected to the outer ring as the first bearing ring, and the measuring element being in the form of a ring eccentric with the axis of rotation and connected to the inner ring as the second bearing ring or in the form of a ring concentric with the axis of rotation and having nonparallel cover surfaces connected to the inner ring as the second bearing ring, a sealing gap being formed between a radially inner U leg of the pot core and an end face of the inner ring.

19. The roller bearing configuration as recited in claim 1 further comprising a spacer disk made of a nonmagnetic material situated between legs of the U-shaped pot core.

20. The roller bearing configuration as recited in claim 19 further comprising a spring element situated radially outside of the pot core pressing an outer U leg of the legs against the spacer disk.

21. A sensor system comprising:
an angle sensor including a sensor ring surrounding an axis of rotation and a measuring element rotatable in relation to the sensor ring;
at least one transmitting coil and at least one receiving coil situated on the sensor ring, a signal being transmissible between the transmitting coil and the receiving coil via a magnetic circuit, a variable reluctance existing in the magnetic circuit due to the measuring element;
an annular pot core, the transmitting coil being situated in the annular pot core, the annular pot core being is concentric with the axis of rotation and having a U-shaped cross section, and forming a part of the magnetic circuit;

the measuring element being designed as a ring closing the magnetic circuit between legs of the U-shaped pot core;

the receiving coil being situated partially inside and partially outside of the pot core.

22. A method for assembly of a roller bearing configuration having an angle sensor comprising the following steps:

providing a roller bearing designed as a radial bearing and having two bearing rings including an inner ring and an outer ring, a peripheral groove adjacent to a roller bearing track being formed in each of the bearing rings;

snapping a ring eccentric with the axis of rotation of the roller bearing, the ring being a measuring element, into the peripheral groove of the inner ring;

inserting a retaining element designed as a plastic injection-molded part into a supporting ring made of metal, its outside diameter corresponding at most to the outside diameter of the outer ring of the roller bearing;

snapping the retaining element into the peripheral groove of the outer ring, the supporting ring being stopped against an end face of the outer ring;

attaching a sensor ring designed as a printed circuit and provided for carrying out an angle measurement according to the variable reluctance principle, at least one transmitting coil and at least one receiving coil being situated on the sensor ring, to the retaining element in such a way that it is partially in an annular space adjacent to the retaining element and radially directly inside of the supporting ring and partially radially inside of the retaining element, slots describing sections of an annular space remaining between the inside circumference of the retaining element and the parts of the sensor ring situated radially inside of the retaining element; and pushing an annular pot core having a U-shaped cross section, which is open toward the end face of the roller bearing and which is made of a ferromagnetic material forming a component of a magnetic circuit, as does the eccentric ring, in the axial direction onto the configuration of the retaining element, the supporting ring and the sensor ring and thus is snapped to it, so that a U leg of the pot core situated radially outside is in contact with the inside circumference of the retaining element, engaging in the slots adjacent to this retaining element while an inner U leg of the pot core is situated completely radially inside of the sensor ring.

* * * * *